United States Patent [19]

Dabi et al.

[11] Patent Number: 4,521,460

[45] Date of Patent: Jun. 4, 1985

[54] AQUEOUS N-METHYLOLHYDRAZIDE-CONTAINING POLYMER DISPERSION

[76] Inventors: Shmuel Dabi, 218 N. 2nd St., Highland Park, N.J. 08904; Peter Loewrigkeit, 498 Vance Ave., Wyckoff, N.J. 07481; Kenneth A. Van Dyk, 6 Fox Trail, Deertrail Lake, Stockholm, N.J. 07460

[21] Appl. No.: 503,336

[22] Filed: Jun. 10, 1983

[51] Int. Cl.$^3$ .............................................. B05D 3/02
[52] U.S. Cl. .............................. 427/385.5; 427/388.2; 427/388.4; 427/389; 427/389.7; 427/393; 427/393.5; 524/510; 525/327.6; 525/328.2; 525/376
[58] Field of Search ................ 524/510; 525/327.6, 525/328.2, 376; 427/385.5

[56] References Cited

U.S. PATENT DOCUMENTS

| | | | |
|---|---|---|---|
| 3,255,147 | 6/1966 | Krueger et al. | 525/489 |
| 4,171,413 | 10/1979 | Hartman et al. | 525/376 |
| 4,335,029 | 6/1982 | Dabi et al. | 524/589 |

*Primary Examiner*—Joseph L. Schofer
*Assistant Examiner*—J. M. Reddick
*Attorney, Agent, or Firm*—Wallenstein, Wagner, Hattis, Strampel & Aubel

[57] ABSTRACT

A stable aqueous dispersion of a room temperature curing polymer effective for forming films resistant to water and organic solvents, said polymer being a water-dispersible vinyl addition polymer containing a sufficient proportion of pendant N-methylolhydrazide groups to cause the polymer to cure in situ on a substrate when said dispersion is applied to the substrate and dried at ambient temperature. The polymer preferably sufficient pendant carboxylic salt groups to render the polymer water-dispersible or water soluble.

18 Claims, No Drawings

AQUEOUS N-METHYLOLHYDRAZIDE-CONTAINING POLYMER DISPERSION

This invention relates to aqueous polymeric dispersions and especially to aqueous dispersions of room or ambient temperature curing polymers effective for depositing water resistant and organic solvent resistant films on any suitable substrate, and methods of making and using such dispersions.

Polymeric dispersions, including solutions, have found widespread use in the production of self-sustaining films, and coatings and impregnants for many substrates such as fabrics, plastics, wood, metal and the like, serving decorative, protective, informative and other purposes. Properties sought for in such films and coatings generally include optimal resistance to chemicals, abrasion, organic solvents and water, toughness, elasticity, and durability and the like. Such dispersions commonly contain either an organic solvent or aqueous carrier medium.

Organic solvent media are of course more expensive than water. When an organic solvent polymer dispersion is deposited on a substrate, the solvent either vaporizes into the atmosphere as an economic loss, or may be recovered, but again at considerable cost in equipment, materials and the like. Further, vaporization into the atmosphere is inherently pollutive and an environmental hazard, organic solvents being more or less toxic, odoriferous, or photochemically sensitive and thus smog-formers in the daylight atmosphere due to photochemical oxidation. A water medium is subject to none of these disadvantages, is practically costless relative to organic solvents, can be quickly thinned with readily available water, and is readily amenable to cleanup operations with water.

One approach to provide water-dispersible polymer-containing dispersions has been through the use of emulsifiers. While this expedient is often acceptable, such dispersions are often relatively unstable and often yield water-sensitive films and coatings.

It has also been previously proposed to render polymers dispersible in water by providing the polymer chain with water-dispersing groups such as pendant acid salt groups.

In depositing either type of aqueous polymeric dispersion, the polymer in the deposited film is typically cured or hardened by treatment with UV radiation and/or at elevated temperatures, e.g. baking in an oven or other closed area, infra-red energy, etc. and/or by including in the dispersion or depositing step a catalyst, curing or hardening agent. UV radiation and high temperature curing involve costly equipment and facilities and cannot be employed in many uses. Catalysts, curing or hardening agents involve careful testing for compatability, effectiveness and the like and tend to introduce problems with respect to stability, durability and the like of the dispersion and deposited film. Importantly, films hitherto produced with aqueous polymeric dispersions or latices have not been entirely satisfactory with respect to sufficient hardening, curing and/or cross-linking under ambient, e.g. room temperature, conditions and resistance to both water and organic solvents.

Our U.S. Pat. No. 4,335,029 issued June 15, 1982 discloses and claims aqueous polymeric dispersions, and their production, which are substantially free of such deficiencies and disadvantages, but the patented invention is directed specifically to polyurethane dispersions, the inclusion of melamine in the polymer chain to overcome the sensitivity of the deposited film to organic solvents, chain extension prior to hydrazide introduction, and room temperature curable and cross-linking N-methylol hydrazide terminii.

It is accordingly an object of this invention to provide new and useful aqueous polymeric compositions and dispersions or latices, and methods of making and using same, which will not be subject to one or more of the above deficiencies or disadvantages. Other objects and advantages will appear as the description proceeds.

The attainment of the above objects is made possible by this invention which includes the provision of a stable aqueous dispersion of a room temperature curing polymer effective for forming films resistant to water and organic solvents, said polymer being a water-dispersible vinyl addition polymer containing a sufficient proportion of pendant N-methylolhydrazide groups to cause the polymer to cure in situ on a substrate when said dispersion is applied to the substrate and dried at ambient temperatures.

In the above defined dispersions of this invention, the polymer contains, in the N-methylolhydrazide groups, "built-in" curing, hardening or cross-linking moieties, thereby avoiding the need for an external catalyst, hardening or curing agent or cross-linker, which moieties effectively cause or undergo selfcondensation, cross-linking, hardening and curing under ambient conditions upon drying of the deposited latex film on the substrate, thereby avoiding the need for treatment with UV radiation and/or at elevated temperatures or the like. The N-methylol hydrazide group typically has the formula $-CONH-NH-CH_2OH$, the N-bonded H atoms being, less preferably, replaceably by $C_{1-12}$, preferably $C_{1-2}$, alkyl.

According to a preferred embodiment of this invention, a more stable and/or higher solids aqueous dispersion or latex is produced by employing therein a polymer which contains still another "built-in" agent, namely water-dispersing moieties, more particularly a sufficient proportion of water-dispersing carboxylic salt groups to render the polymer dispersible in water.

The term "polymer" is employed herein to include homopolymers, copolymers, interpolymers, heteropolymers and the like prepared from one or more monomers. The term "vinyl addition polymer" is employed herein to mean, as known in the art, a polymer produced by the addition polymerization of one or a mixture of monomers containing one or more internal or terminal polymerizable ethylenically unsaturated groups. This type of polymerization, in which the monomers "add" to each other at the double bonds to produce polymer chains composed essentially of carbon atoms, is to be distinguished from other types of polymerization involving other reactions in the production of linear polyamides, polyesters and polyurethanes, aldehyde condensation polymers, and the like.

A critical feature of this invention resides in the use of an aqueous medium in which the defined N-methylolhydrazide-containing polymer is formed and/or dispersed. Not only is water a highly preferred carrier medium for reasons pointed out above, but in the present invention it peculiarly functions to prevent a premature exothermic reaction with gellation which would occur in its absence. Equally significant is the ability of the defined polymer to cross link, cure and harden at ambient temperatures after all or most of the water has evaporated from the dispersion or film deposited on a substrate.

Another aspect of this invention resides in the provision of a method of preparing a stable aqueous dispersion of a room temperature curing polymer effective for forming films resistant to water and organic solvents comprising mixing, with an aqueous dispersion of a precursor water-dispersible vinyl addition polymer containing a proportion of pendant hydrazide groups which, when N-methylolated, is sufficient to cause the polymer to cure in situ on a substrate when said dispersion is applied to the substrate and dried at ambient temperatures, an amount of formaldehyde at least sufficient to N-methylolate said proportion of pendant hydrazide groups.

Aqueous dispersions of many of the precursor water-dispersible vinyl addition polymers containing pendant hydrazide groups which are employed in the above-defined method of this invention for reaction with formaldehyde are disclosed in U.S. Pat. No. 4,171,413 dated Oct. 16, 1979 and the disclosure of this patent is incorporated herein by reference to avoid needless repetition. The following discussion is explanatory and supplementary to the disclosure in this patent.

In general, the precursor hydrazide-containing polymers employed in the process of this invention should be devoid of interfering groups, i.e. groups which would interfere with the desired reaction between the formaldehyde and the pendant hydrazide groups. As indicated in U.S. Pat. No. 4,171,413, vinyl monomers used in making the precursor vinyl addition polymer should not contain an N-methylol group, and should preferably be devoid of epoxy and nitrile groups which tend to lead to premature gelation of the hydrazide group-containing precursor polymer. In the latter polymer, acylhalide and —CNO groups should also be avoided since they are too reactive, tending to promote premature cross-linking, gelation, preferential reaction with the formaldehyde, etc.

According to U.S. Pat. No. 4,171,413, vinyl addition polymers are prepared by known vinyl addition polymerization in the presence of known free radical vinyl polymerization catalysts, or redox systems from ethylenically unsaturated monomers containing functional groups such as carboxyic acid, ester, amide and/or anhydride groups which are reactive with hydrazine. Listed as operative monomers are generally the alpha, beta-ethylenically unsaturated carboxylic acids such as acrylic, methacrylic, itaconic, crotonic, maleic and fumaric acids, and various amides, N-alkoxyalkyl-substituted amides, alkyl esters and hydroxyalkyl esters of such acids. The polymer preferably contains, to render it water-soluble or dispersible, sufficient carboxylic acid groups neutralized in salt form with suitable basic compound, inorganic such as alkali metal hydroxides, or organic such as the preferred tertiary amines, including triethylamine, and other such bases such as ammonia, $C_{1-4}$ mono-, di- and tri- alkyl and/or alkanolamines, morpholine, cyclohexylamine, and the like. The aforementioned functional group-containing monomers may be copolymerized with any other non-functional or non-interfering ethylenically unsaturated monomers such as monoolefinic and diolefinic hydrocarbons including styrene, 1,3-butadiene, isoprene, vinyl toluene and the like.

For coating and film-forming purposes, the molecular weight of the vinyl addition polymer should range from about 1500 to about 300,000 on a weight average basis. The higher molecular weight polymers have very high viscosities and must be diluted, sometimes to undesirably low solids content, to be usable. Lower molecular weight polymers, for example below about 40,000, are desirable to permit formation of high solids, relatively low viscosity dispersions. Mercaptans and similar well known chain transfer agents may be added to the polymerization mixture to produce these lower molecular weight polymers or oligomers.

According to the teachings of U.S. Pat. No. 4,171,413, the vinyl addition polymer containing carboxylic salt groups and functional acid, ester and/or anhydride groups is then treated with sufficient hydrazine to yield a polymer containing the desired proportion of hydrazide groups by reaction with said functional groups. Significantly, this patent incorporates by reference a more extensive list of monomers disclosed in U.S. Pat. No. 3,255,147, which list includes monomers containing different functional, hydrazine-reactive groups such as halogenated olefins including alpha-chlorostyrene and 2-bromoheptene, and halogen-containing esters of vinyl, allyl, and methallyl alcohols. When these monomers are vinyl addition-polymerized, the polymer chain would contain pendant halogen atoms which, when reacted with hydrazine according to the teachings of U.S. Pat. No. 4,171,413, would yield a hydrohalide byproduct and a hydrazine-substituted group of the formula

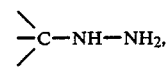

and not the desired hydrazide group of the formula —CONH—NH$_2$ required in the process of the present invention for reaction with formaldehyde. In such case, the vinyl addition polymer containing such pendant reactive halogen atoms would instead be reacted with a difunctional reactant, one functional group being a hydrazide and the other being preferentially reactive with the halogen atom with liberation of hydrohalide byproduct. Examples of such difunctional reactants include carbodihydrazide, the adipic, oxalic, isophthalic, tartaric, and omega-amino-caproic acid dihydrazides and dihydrazides of other dicarboxylic acids, bis-semicarbazide, bis-hydrazide carbonic esters of glycols, and the like.

The precursor vinyl addition, pendant hydrazide-containing polymers employed herein for reaction with formaldehyde may also be prepared by the vinyl addition polymerization of one or more vinyl type monomers (ethylenically unsaturated) containing a pendant hydrazide group. In this method of preparation, it should again be obvious that none of the components of the polymerization mixture should contain interfering groups, i.e. groups which would prematurely react with the pendant hydrazide group and/or otherwise interfere with the desired addition polymerization across the double bonds in the monomers.

With respect to interfering groups or components discussed hereinabove, it should be noted that an excess of the defined critical N-methylolhydrazide groups leading to premature, cross-linking gelation, precipitation, etc. of the polymer in the dispersion prior to film formation could also be termed interfering to that extent. The maximum safe proportion of N-methylol hydrazide groups to avoid such premature reactions is dependent on a number of factors including the makeup of the polymer, concentration of polymer in the dispersion, ambient storage conditions, etc., is accordingly difficult to accurately predict and define, but is readily determinable by routine experimentation in any particular instance. Typically, such safe proportion generally falls within a range of about 1 to about 10 wt. % of pendant N-methylol hydrazide groups in the polymer, such proportion of course being sufficient to cause the polymer to cure in situ on a substrate when the dispersion thereof is applied to the substrate and dried at ambient conditions. The proportion in any particular instance is preferably achieved by employing a precursor vinyl addition polymer containing just sufficient pendant hydrazide groups and reacting all such groups with formaldehyde, i.e. an amount of formaldehyde stoichiometrically sufficient to N-methylolate all the hydrazide groups. The precursor polymer may however contain excess pendant hydrazide groups, in which case not all need be N-methylolated. Such excess, i.e. the proportion of hydrazide groups remaining unreacted with formaldehyde, should generally not exceed about 5 wt. %. Broadly speaking, an amount of formaldehyde is employed which is about 60 to about 120% of the amount stoichiometrically needed to react with and N-methylolate all the pendant hydrazide groups in the precursor polymer.

As indicated above, the precursor hydrazide-containing polymer may be dispersed in the aqueous medium with the acid of an emulsifying agent, for example as employed in an aqueous emulsion polymerization for producing the precursor polymer. Generally, the known anionically active emulsifying agents are preferred, for example the phosphates, phosphonates, and preferably the sulfates and sulfonates of hydrophobic moieties, e.g. of about 10 to 20 or more carbon atoms, such as higher alkyl sulfates and sulfonates, alkaryl sulfonates such a dodecylbenzene sulfonate, sulfates and sulfonates of polyoxyethylenated higher alkanols and alkylphenols such as nonyl phenol, etc. Nonionic surfactants may also be employed such as the known polyoxyethylenated alkanols, alkyl phenols and other active hydrogen-containing hydrophobes, or mixtures of nonionic and anionic emulsifying agents. The amount of emulsifying agent employed is not critical and will vary, for optimum effects, depending on the type and concentration of polymer, whether employed in the polymerization process or added subsequently, etc., typically ranging from about 1 to about 8 wt. % of the dispersion.

As indicated above, and irrespective of whether or not an emulsifying agent is present, it is preferred to employ for reaction with the formaldehyde precursor pendant hydrazide-containing polymers which also contain carboxylic salt groups for improved solubility, dispersibility, increased solids content, etc. Salts with volatile amines such as triethylamine have the further advantage of volatilizing of decomposing during the drying or curing of the latex film deposit, whereby the dried hardened film is less sensitive to moisture. It should be noted that the carboxylic groups exert their water-dispersing function substantially only when neutralized in salt form with resultant pH of more than 7 up to about 9.5 to 10, and that too high a proportion of carboxylic salt groups in the polymer undesirably increases the water sensitivity of the resulting films. Accordingly, in the interest of efficiency and economy, it is preferred to neutralize substantially all (e.g. about 100%) of the pendant carboxylic acid groups in the precursor polymer, although lower proportions down to about 40% may be neutralized, and to insert in the precursor polymerization medium no more carboxyl-providing reactant or monomer than is needed to yield a final N-methylol hydrazide-containing polymer containing about 0.5 to about 10 wt. % of pendant carboxylic salt groups.

According to this invention, the precursor pendant hydrazide-containing polymer is reacted with formaldehyde to provide the desired proportion of N-methylol hydrazide groups. The formaldehyde is usually in the form of an aqueous solution, e.g. of about 20 to about 45 wt. % formaldehyde. Instead of formaldehyde per se, formaldehyde-yielding compounds may be employed such as polyoxymethylene, trioxane, paraformaldehyde, and/or hexamethylene tetramine. The reaction between the formaldehyde and the hydrazide groups is "preferential" and proceeds readily at ambient temperatures to completion in brief reaction times, for example from about 0.5 to about 4 hours. The term "preferential" here means that, as indicated above, the formaldehyde reacts with the hydrazide groups in the precursor polymer in preference to any other groups therein, such other groups being thus inert, non-interfering or less reactive than the hydrazide groups with formaldehyde.

The concentration of the precursor hydrazide-containing polymer in the dispersion with which the formaldehyde is admixed is not critical, but relatively higher concentrations or solids contents are, at least ecomonically, preferred. Thus, such concentrations are preferred yielding dispersions directly adapted for coating or film deposition, e.g. dispersions containing about 15 to about 60 wt. % of the N-methylol hydrazide-containing preferably carboxyl salt-containing, polymer.

Also included is a method of forming on a substrate a polymeric film resistant to water and organic solvents comprising applying to such substrate a film-forming amount of a stable aqueous dispersion of the above described vinyl addition polymer containing a sufficient proportion of pendant N-methylol hydrazide groups to cause the polymer to cure in situ on the substrate when the dispersion is applied to the substrate and dried at ambient temperatures, and then so drying the film on the substrate. The latex products or dispersions of this invention may be applied as a permanent coating or film on any substrate including wood, metals, glass, cloth, plastics, foam and the like, by any conventional method including brushing, dipping, flow coating, casting, spraying and the like, or they may be applied as a temporary coating or film on a release surface or substrate from which it is later separated for the production of cast or self-sustaining films and articles. In the application of the dispersion to the substrate, the dispersion may as needed or desired be further diluted with water and/or organic solvents, preferably water miscible, or the dispersion may be further concentrated by evaporation of water and/or organic components of the liquid carrier medium therein.

The compositions of this invention may contain other conventional ingredients including organic solvents, pigments, dyes, wetting agents, surfactants, thickeners, heat stabilizers, levelling agents, anti-cratering agents, fillers, antioxidants, UV absorbers, sedimentation inhibitors and the like introduced at any stage of the production process or subsequently.

It will be understood that the term "pendant" as employed herein with respect to hydrazide and carboxylic salt groups refers to such groups which are essentially monovalent terminii or preferably recurring side chains joined directly or indirectly to the fundamental linear vinyl addition polymer chain, and not internal divalent linking units in the chain. It will also be understood that specific polymerizable ethylenically unsaturated monomers, and specific functional groups reactive with hydrazine or hydrazides to provide the precursor vinyl addition polymer with pendant hydrazide groups, mentioned hereinabove are only illustrative and not exclusive of any monomers, functional groups, etc. effective for providing an aqueous dispersion of a vinyl addition polymer containing pendant hydrazide groups with which the formaldehyde preferentially reacts to form the desired room-temperature curable N-methylol hydrazide groups according to this invention. For example vinylene carbonate and vinyl butyrolacetone may be employed as precursor polymer components convertible to hydrazide groups, and crotonyl hydrazide, fumaryl hydrazide, maleic hydrazide, etc. may be employed as monomers eliminating the subsequent hydrazine treatment of U.S. Pat. No. 4,171,413. Further, when the latter hydrazine treatment of polymers containing functional carboxylic acid, ester, amide and/or anhydride groups is substituted by a reactive treatment with a difunctional hydrazide reactant as described above and illustrated in Example 1 below, a precursor polymer containing bis-hydrazide or equivalent groups is obtained which may be even more amenable to N-metholation with formaldehyde and the resulting N-methylolated bis-hydrazide groups may be better cross-linking moieties at ambient temperatures.

The following examples are only illustrative of preferred embodiments of this invention and are not to be considered limitative. All amounts and proportions referred to herein and in the apended claims are by weight unless otherwise indicated.

EXAMPLE 1

To a 1000 ml. resin kettle equipped with an $N_2$ inlet tube, stirrer, condenser and thermometer, add 300 g. of anhydrous tetrahydrofuran and 100 g. of a styrene/maleic anhydride copolymer of 1700 molecular weight having an acid number of 345 mg. KOH/g. (5.84 maleic anhydride groups/mole). Add 7.64 g. (0.239 eq.) of methanol and heat to mild reflux for 8 hours. The reaction is cooled to 30° C. and the resulting half methyl ester/anhydride is further treated with 10.72 g. (0.234 eq.) of adipic dihydrazide. The mixture is allowed to react for 3 hours to produce the precursor adipic hydrazide-containing polymer. To 300 g. of deionized water is added 15.55 g. (0.154 eq.) of triethylamine with mixing. The above precursor reaction medium is introduced to the water solution of triethylamine with high shear agitation to produce an anionic dispersion of the triethylamine salt of the precursor. After stirring for 15 minutes at 25° C., 5 g. of a 37% aqueous solution of formaldehyde (0.062 eq.) is added and the polymer is allowed to stir for 1 hour. Tetrahydrofuran is now removed at 50° C. under vacuum to complete the preparation.

This example illustrates the introduction of hydrazide groups into a vinyl addition polymer containing carboxylic acid/ester/anhydride groups to produce a precursor reactive with formaldehyde. The half methyl ester is first produced to reduce the number of anhydride groups preferentially reactive with formaldehyde. The copolymer at this stage has units of the formulae

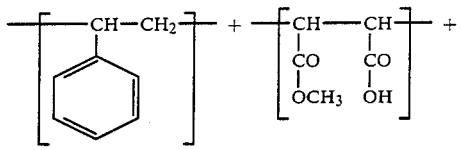

(A)　　　　(B)

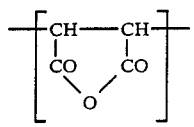

(C)

Substantially all the anhydride (C) groups are then reacted with adipic dihydrazide to produce units of the formula:

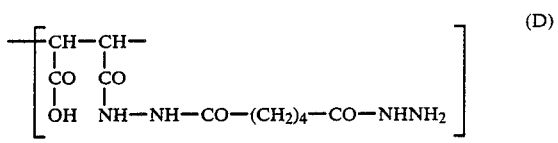

Substantially all the carboxylic acid (COOH) groups in units B and D are then neutralized with the triethylamine, and the resulting precursor reacted with formaldehyde to produce the N-methylolated derivative of the D units, of the formula

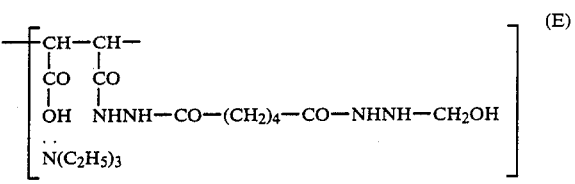

When the resulting dispersion is applied in a film-forming amount to a substrate and dried at RT, the film cures and hardens in situ, involving a cross-linking reaction between the N-methylol hydrazide groups in adjacent polymer chains with formation of a cross-link of the formula —CONHNH—CH$_2$—O—CH$_2$—NHNH-CO—.

EXAMPLE 2

To a 1000 ml. round bottom flask equipped with stirrer, thermometer, condenser, and gas inlet tube is added 215 g. of a 40% solids polymethyl acrylate aqueous emulsion and 1.765 g. (0.06 eq.) of hydrazine monohydrate (85% solution in water). Heat to 70° C. for 24 hours. The resulting precursor hydrazide-containing polymer is cooled to 25° C. and treated with 2.43 g. (0.03 eq.) of a 37% aqueous formaldehyde solution. Stirring is continued for 2 hours to complete the preparation of the desired dispersion of room temperature curing N-methylol hydrazide-containing polymer.

This example illustrates the use as precursor of an aqueous dispersion of a vinyl addition polymer devoid of carboxylic salt groups, dispersed with the aid of emulsifying agents.

EXAMPLE 3

This example illustrates the use of a hydrazide-containing monomer to produce, by copolymerization with other vinyl monomers, an aqueous dispersion of a precursor vinyl addition polymer containing pendant hydrazide groups and water-dispersing or water-solubilizing carboxylic salt groups.

To a 1000 ml. flask equipped with stirrer, thermometer, reflux condenser, $N_2$ inlet tube and dropping funnel is charged 500 g. of methylene chloride and 77.5 g. (0.5 mole) isocyanatoethyl methacrylate. Further added to the flask is 29.41 g. (0.5 mole) of hydrazine hydrate, 85% in water and 300 g. of water. Vigorously mix for 1 hour. Allow to separate into layers, decant the methylene chloride layer. The aqueous layer contains the desired product, 2-semicarbazido ethyl methacrylate, a monomer of the formula

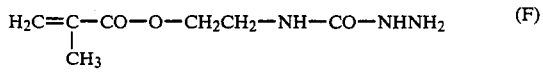

which is utilized to prepare a copolymer as follows:

| Formulation | Parts, g. |
|---|---|
| Water | 498.41 |
| Butyl acrylate | 137.6 |
| Styrene | 137.6 |
| 2-semicarbazido ethyl methacrylate[1] | 51.6 |
| Acrylic acid | 17.3 |
| Sipex ES (Alcolac)[2] | 24.4 |
| Siponic L 12[3] | 14.6 |
| Sodium persulfate | 2.0 |
| 2% Sodium metabisulfite | 70.0 |
| Triethyl amine | 24.24 |
| Formaldehyde (37% aqueous) | 22.25 |

[1]100%, in form of above aqueous layer.
[2]Sodium tridecyl (oxyethylene)$_{15}$ sulfate.
[3]Sodium $C_{12-15}$ alkyl sulfate.

PROCEDURE

1. The water is added to a 2 liter round bottomed reaction flask and sparged for 15 minutes with nitrogen.

2. The emulsifiers, Sipex ES and Siponic L 12, are dissolved in the water, then 20% of the monomer mixture consisting of butyl acrylate, styrene, 2-semicarbazido ethyl methacrylate and acrylic acid is added and the mixture is stirred until an emulsion is formed. The emulsion is sparged with nitrogen for another 5 minutes.

3. The temperature of the batch is raised to 45°–50° C. at which point the sodium persulfate is added and allowed to dissolve while stirring. The reaction is then initiated by adding 4 ml. of the 2% bisulfite solution.

4. Continue heating the batch. After reaching 60° C., a uniform flow of the remaining monomer mixture is started, scheduled so that the delay time is 1 hour. Concurrently, the 2% bisulfite solution is also added but at such a rate that by the time the monomer addition is completed, only half the bisulfite solution is consumed. The reaction temperature during the addition time is maintained at 70°–75° C. The reaction is exothermic so moderate cooling is necessary to maintain the specified reaction temperature.

5. After the monomer addition is completed, the reaction continues to exotherm. When the exotherm ceases, the batch is heated to 80° C. and held at this temperature for ½ hour. During this heating cycle, the remaining half of the metabisulfite solution is added at a uniform rate.

6. The batch is then cooled to room temperature.

7. Neutralize slowly (15 minutes) with 24.24 g. (0.024 eq.) triethyl amine to pH 7.8.

8. The emulsion is held at room temperature and treated with 22.25 g. (0.276 eq.) of aqueous 37% formaldehyde solution.

9. Stirring is continued for 1 hour to completion. The resulting emulsion has a solids content of 37% and a pH of 7.8, and is readily applied directly as by brushing on a substrate and dried at ambient temperatures with concurrent hardening, curing and cross-linking of the film on the substrate.

EXAMPLE 4

A styrene/maleic anhydride resin half methyl ester formulated with a carboxylated polyethylene emulsion and nonionic surfactant flow modifier is coated onto black glass and dried. A water spot test consisting of 10 drops of water on the coating for 10 minutes whitens the coating which can easily be removed by rubbing.

The dispersion product according to Example 1 above is formulated, coated and tested as in the preceding paragraph. The coating on the black glass substrate remains unaffected during the 10 minute water test and is not removable by rubbing.

Room temperature cured films from the products of Examples 1, 2 and 3 are as desired resistant to water and organic solvents.

This invention has been disclosed with respect to preferred embodiments and it will be understood that modifications and variations thereof obvious to those skilled in the art are to be included within the spirit and purview of this application and the scope of the appended claims.

We claim:

1. A stable aqueous dispersion of a room temperature curing polymer effective for forming films resistant to water and organic solvents, said polymer being a water-dispersible vinyl addition polymer containing pendant N-methylolhydrazide groups effective to cause the polymer to undergo self-condensation, cross-linking, hardening and curing in situ on a substrate when said dispersion is applied to the substrate and dried at ambient temperatures, said dispersion being free of interfering groups which would prematurely react with the pendant N-methylolhydrazide groups and/or interfere with the self-condensation, cross-linking, hardening and curing of the dispersion when applied to a substrate and dried at ambient temperatures, said pendant N-methylolhydrazide groups being present in an amount such that premature self-condensation and cross-linking do not take place in the dispersion.

2. A dispersion according to claim 1 wherein said polymer contains about 1 to about 10 wt. % of pendant N-methylol hydrazide groups.

3. A dispersion according to claim 2 wherein said polymer further contains pendant water-dispersing carboxylic salt groups in an amount to render said polymer water-dispersible.

4. A dispersion according to claim 3 wherein said polymer contains about 0.5 to about 10 wt. % of said carboxylic salt groups.

5. A dispersion according to claim 1 prepared by mixing formaldehyde with an aqueous dispersion of a precursor water-dispersible vinyl addition polymer containing a proportion of pendant hydrazide groups which, when N-methylolated, is effective to cause the polymer to undergo self-condensation, cross-linking, hardening and curing in situ on a substrate when said dispersion is applied to the substrate and dried at ambient temperatures, the formaldehyde acting to N-methylolate said pendant hydrazide groups.

6. A dispersion according to claim 5 wherein the formaldehyde-reacted polymer contains about 1 to about 10 wt. % of pendant N-methylol hydrazide groups.

7. A dispersion according to claim 6 wherein said formaldehyde-reacted polymer further contains about 0.5 to about 10 wt. % of pendant water-dispersing carboxylic salt groups.

8. A dispersion according to claim 6 wherein said precursor polymer contains in the polymer chain units derived from methylacrylate.

9. A dispersion according to claim 7 wherein said precursor polymer contains in the polymer chain units derived from styrene and maleic anhydride.

10. A dispersion according to claim 7 wherein said precursor polymer contains in the polymer chain units derived from butyl acrylate, styrene, 2-semicarbazido-ethyl methacrylate and acrylic acid.

11. A method of preparing a stable aqueous dispersion of a room temperature curing polymer effective for forming films resistant to water and organic solvents comprising: forming a reaction mixture of formaldehyde and an aqueous dispersion of a precursor water-dispersible vinyl addition polymer containing a proportion of pendant hydrazide groups which, when N-methylolated, is effective to cause the polymer to undergo self-condensation, cross-linking, hardening and curing in situ on a substrate when said dispersion is applied to the substrate and dried at ambient temperatures, the formaldehyde being present in amount to N-methylolate said proportion of pendant hydrazide groups, said reaction mixture being free of interfering groups which would prematurely react with the pendant hydrazide groups and/or interfere with the self-condensation, cross-linking, hardening and curing of the dispersion, said pendant hydrazide groups being present in an amount such that premature self-condensation and cross-linking do not take place in the reaction mixture.

12. A method according to claim 11 wherein said polymer, when reacted with said formaldehyde, contains about 1 to about 10 wt. % of N-methylol hydrazide groups.

13. A method according to claim 12 wherein the N-methylolated polymer further contains pendant water-dispersing carboxylic salt groups in an amount to render said polymer water-dispersible.

14. A method according to claim 13 wherein said N-methylolated polymer contains about 0.5 to about 10 wt. % of said carboxylic salt groups.

15. A method of forming on a substrate a polymeric film resistant to water and organic solvents comprising applying to such substrate a film-forming amount of a stable aqueous dispersion as defined in claim 1 and subjecting the film on the substrate to drying conditions at ambient temperatures whereby said polymer is cured in situ on the substrate.

16. A method according to claim 15 wherein said stable aqueous dispersion contains about 15 to about 60 wt. % of said polymer, which polymer contains about 1 to about 10 wt. % of N-methylol hydrazide groups.

17. A method according to claim 16 wherein said polymer further contains water-dispersing carboxylic salt groups in an amount to render the polymer water-dispersible.

18. A method according to claim 17 wherein said polymer contains about 0.5 to about 10 wt. % of said carboxylic salt groups.

* * * * *